March 18, 1952     G. L. DIMMICK ET AL     2,589,930
COLOR TELEVISION LIGHT DIVIDER
Filed March 17, 1948     2 SHEETS—SHEET 1
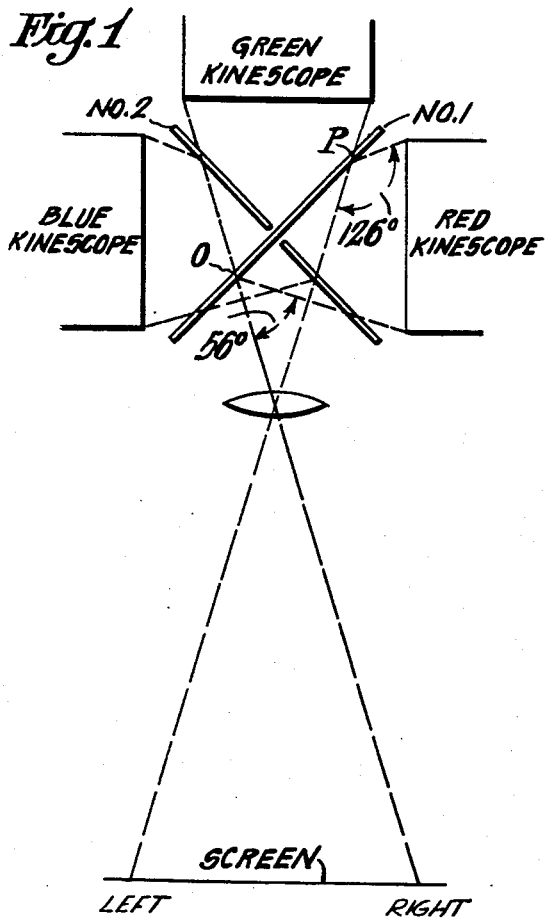
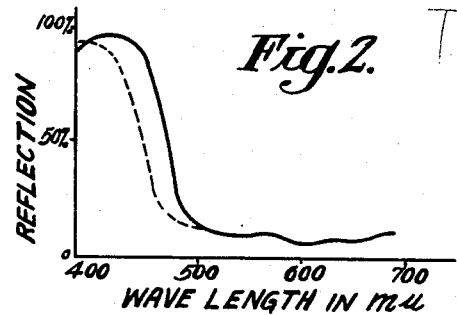
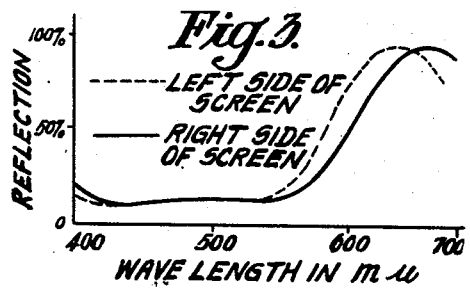
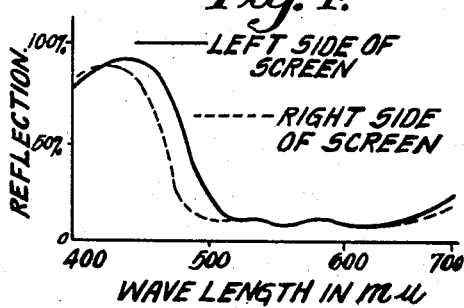
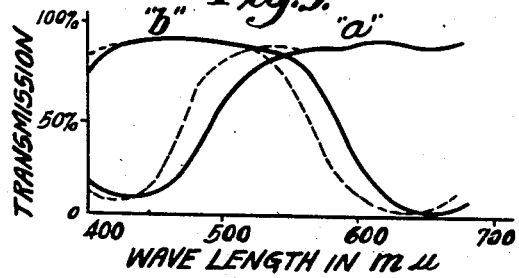
INVENTORS
GLENN L. DIMMICK
& MARY E. WIDDOP
BY
ATTORNEY March 18, 1952  G. L. DIMMICK ET AL  2,589,930
COLOR TELEVISION LIGHT DIVIDER
Filed March 17, 1948  2 SHEETS—SHEET 2
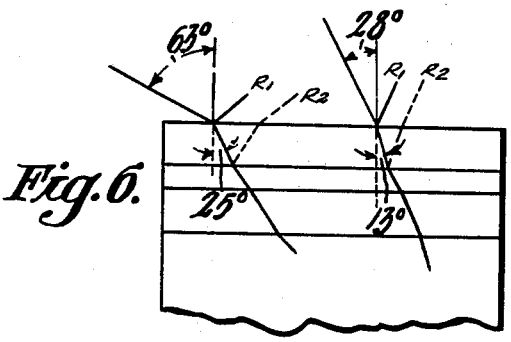
Fig. 6.
Fig. 7.
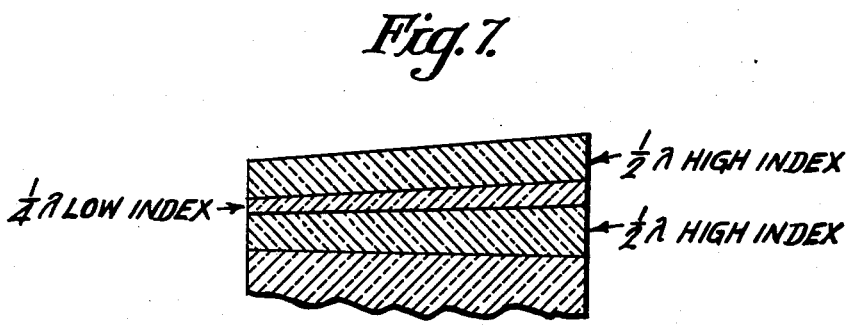
Fig. 8.
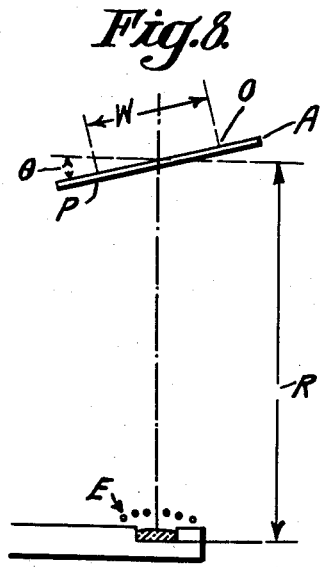
INVENTORS
GLENN L. DIMMICK
& MARY E. WIDDOP
BY
ATTORNEY Patented Mar. 18, 1952

2,589,930

UNITED STATES PATENT OFFICE 2,589,930

COLOR TELEVISION LIGHT DIVIDER

Glenn L. Dimmick and Mary E. Widdop, Haddon Heights, N. J., assignors to Radio Corporation of America, a corporation of Delaware Application March 17, 1948, Serial No. 15,386

10 Claims. (Cl. 88—1)

This invention relates to dichroic reflectors, and more particularly to improvements in crossed dichroic reflectors.

In a paper by G. L. Dimmick entitled "A new dichroic reflector and its application to photocell monitoring systems" appearing in the "Journal of the Society of Motion Picture Engineers," volume 38, January 1942, on pages 36–44, there is shown and described a selective reflector which can advantageously be employed for breaking light into certain selected component colors. Although it is unnecessary to here repeat the paper, the operation of this invention in one of its preferred forms will be more readily understood after a brief explanation of the operation of a color selective reflector.

It has been known for some time that thin films of some materials are selective in their ability to reflect and transmit light. A thin film of gold is quite transparent to green light and shows strong selective reflection for the red and yellow region. Many aniline dyes appear to have one color when viewed by reflected light and another color when viewed by transmitted light. The material possesses what is known as a surface color, and the transmitted light gets its color by being deprived of certain rays by reflection at the surface and certain others by absorption in the interior.

There is another type of selective reflector which depends upon the interference of light in thin films. This type is far more efficient because the absorption is usually negligible. In its simplest form, this reflector consists of a single thin film between two transparent media. A soap bubble and a layer of oil on water are perhaps the most commonly experienced examples of this type.

If it is desired to make use of the interference principle to obtain a selective reflector capable of reflecting a large percentage of light in the narrow region of the spectrum, it is found that a single thin film would be inadequate for the purpose. Both the intensity and the purity of reflected light may be increased through the use of multiple films arranged in alternate layers having different indices of refraction.

By employing a plurality of such selective reflectors, each having different light transmission and light reflective characteristics, an efficient light splitter or component color combiner may be provided.

It will be seen from the above discussion that the operation of a dichroic surface is dependent upon its thickness, the effective thickness, of course, benig dependent upon the direction of approach of the rays of light. It will therefore be seen that if the light rays approach the surface at a relatively wide angle, the surface coating will not present the same effective thickness to all the rays of light. Such a characteristic will reduce the efficiency of the dichroic reflector.

According to this invention, the dichroic coating or coatings are tapered in thickness over a supporting surface upon which the rays of light approach through a range of different angles in order that the coating or coatings present the same effective thickness to all the rays of light regardless of the angle of incidence.

An improved form of color selective reflector has been proposed involving a pair of crossed dichroic mirrors. Such an arrangement is shown and described in the copending U. S. application of Alfred C. Schroeder, Serial No. 731,647, filed February 28, 1947. In the copending application of Schroeder referred to immediately above, a plurality of dichroic mirrors are efficiently positioned to intersect each other and to extend on both sides of the other in the light path such that the light path passes through the dichroic mirrors about their intersection. A very important advantage of this type of light splitter may be found in the fact that it permits the employment of short focal length lenses and a corresponding high degree of efficiency.

It will be seen, however, that by employing fast lenses in such an arrangement for increased efficiency, light rays will not impinge on the dichroic surfaces at equal angles but will impinge over a wide range of angles.

It is for such an arrangement that this invention is particularly useful. By employing the tapered coatings in accordance with the teachings of this invention, such a high efficiency system may be made to perform with a high degree of accuracy.

Accordingly, a primary object of this invention is to provide an improved color selective reflector.

Another object of this invention is to provide an improved component color separator.

Still another object of this invention is to provide an efficient and compact light splitter for employment in separation of light into its component colors or combining component colors to form a desired color.

Still another object of this invention is to provide improved color separation in crossed dichroic reflectors.

Other and incidental objects of the invention will be apparent to those skilled in the art from a reading of the following specification and an inspection of the accompanying drawing in which:

Figure 1 shows schematically a crossed dichroic reflector illustrating the need for the practice of this invention;

Figures 2, 3, 4 and 5 illustrate graphically the operation of this invention;

Figure 6 illustrates schematically the errors caused by wide divergent angles of ray impact in accordance with the teachings of the prior art;

Figure 7 illustrates the operation of this invention; and

Figure 8 illustrates one suitable arrangement for forming surfaces in accordance with the teachings of this invention.

Turning now in detail to Figure 1, one important application of this invention is shown. Although it is not intended that the practice of the present invention should be limited to a form employing crossed dichroic reflectors, for clarity its description will be particularly directed thereto.

Alfred C. Schroeder disclosed in the copending U. S. application referred to above, a color television projection system employing a pair of crossed selective reflectors for component color division. Such an arrangement is shown in Figure 1. Two selective reflectors 1 and 2 are used to superimpose the images from the three kinescopes of a television system or the like upon the screen. The No. 1 selective reflector was designed to reflect most of the red light and transmit most of the blue and green light. The No. 2 selective reflector was designed to reflect most of the blue light and transmit most of the green and red light.

This combination of crossed selective reflectors allows the projection lens to effectively be placed on the axis and closely associated with all three kinescope tubes.

The close association of the lens to the kinescopes causes, as illustrated, a wide difference in angle of incidence for light rays.

In order to more fully explain the results of a wide difference of angle of incidence, it is first necessary to see what happens to the characteristic curve of a selective reflector when the angle of incidence of the light is changed. This may be seen from a study of Figure 2. The full line curve of this blue reflecting selective reflector was taken with light striking it at a relatively small angle of incidence. The dotted line curve is for the same reflector, but with an angle of incidence larger than before. As shown in Figure 2, the result of increasing the angle of incidence is to shift the curve toward the shorter wavelengths. It can be shown that the transmission curve of a selective reflector also shifts toward the shorter wavelengths as the angle of incidence increases.

In Figure 1 it can be seen, by way of example, that the upper limiting ray of the red kinescope strikes the selective reflector 1 so that the angle between the incident and the reflected ray is 126°. It can also be seen that the lower limiting ray of the red kinescope strikes the selective reflector 1 so that the angle between the incident and the reflected ray is 56°. These same limiting angles also hold for the blue kinescope and the green kinescope.

From the above consideration, it can be determined that the curves of Figure 3 represent the energy distribution of the light originating at the upper and lower edges of the red kinescope and striking the left and the right sides of the screen. It can also be shown that the curves of Figure 4 represent the energy distribution of the light originating at the upper and lower edges of the blue kinescope and striking the right and the left sides of the screen. From these curves it can be seen that for both red light and blue light, the right side of the screen gets less visible light energy and is therefore darker than the left side of the screen.

In order to illustrate what happens in the case of the green kinescope, it is only necessary to plot the transmission characteristics of selective reflectors 1 and 2. This is done in Figure 5. From Figure 1 it can be seen that the ray reaching the right side of the screen passes through selective reflector 1 at a relative large angle and through selective reflector 2 at a relatively small angle. The transmission band for this ray is therefore included between the dotted curve "a" of Figure 5 and the full line curve "b." By the same reasoning it can be shown that the ray reaching the left side of the screen includes the band of energy between the dotted curve "b" and the full line curve "a." From Figure 5 it can be seen that a wider band of "green" energy reaches the right side of the screen than the band reaching the left side of the screen. Thus, for green light, the right side of the screen is brighter than the left side, but from Figure 3 and Figure 4 it was shown that for red and for blue light, the right side of the screen is darker than the left side.

The operation of the crossed dichroic reflectors is greatly improved by providing selective reflectors having coating thicknesses which taper from one side to the other. This taper must be the correct amount and must be in only one plane. From Figure 1, it can be seen that one limiting ray from the red kinescope strikes point "P" on reflector 1. The other limiting ray from the red kinescope strikes point "O" of reflector 1. The first limiting ray made a total angle of 126°, while the second limiting ray made a total angle of 56°.

By way of example, let it be assumed that the distance between points "O" and "P" is 1⅜". The selective reflectors are therefore tapered to such degree that the color appears the same at point "P" when viewed at 63° to the normal as it did in point "O" when viewed at 28° to the normal.

In order to produce selective reflectors having the correct amount of taper, the bell jar and associated equipment were arranged like that shown in Figure 5 of the U. S. Patent No. 2,482,329, issued to Glenn L. Dimmick on September 20, 1949, entitled "Improvement in Apparatus for Selective Vapor Coating." The high and low index materials were evaporated from a rotating turret, as shown, while the rotating compensator keeps the evaporated material uniform in thickness over a considerable area in a plane at right angles to the dotted line of Figure 5 of the application referred to immediately above.

Ordinarily the glass is placed in this plane and the resulting selective reflectors are quite uniform in characteristics over their entire area. However, in the present case, the glass was tipped at an angle so that one end of the plate was closer to the evaporator than the other end. The thickness of the evaporated layers at each point would then be inversely proportional to the square of the distance of this point to the evaporator. If the distance from the plate to the evaporator is large as compared to the dimensions of the plate, the resulting taper is nearly linear along the length of the plate.

Fig. 8 shows how the plate is tipped to produce the desired result. The distance from the evaporator "E" to the plate "A" may, for example, be 10″. The distance "W" (from point "O" to point "P" of Figure 1) may be 1⅜″. The angle $\theta$ may be obtained by trial; 15° will prove satisfactory for the taper characteristics used in the example. There are other satisfactory methods for forming a tapered dichroic coating.

For the arrangement shown in Figure 8, the angle $\theta$ of about 15° will produce satisfactory results on the screen of Figure 1. This angle can also be found by a mathematical analysis. Figure 6 shows a three layer selective reflector in which the rays are shown for the two extreme conditions of angle shown in the example of Figure 1. These angles are 63° and 28° from the normal.

Figure 6 shows the angles of refraction in the first or higher index layer. These angles are 25° and 13° respectively, and are obtained from the equation $n \sin i = n' \sin i'$. On page 579 of "The Principles of Optics" by Hardy and Perrin, the equation for the path difference between $R_1$ and $R_2$ of Figure 6 is given as:

$$S = 2n't \cos r' + \frac{\lambda}{2}$$

where $r'$ is the angle of refraction and $t$ is the thickness of the layer. It is desired to make the phase difference the same for a 63° angle of incidence as it is for a 28° angle of incidence and then find the ratio of film thicknesses required to accomplish this. Equating the phase differences we have:

$$2 \times 2.1 \times t_1 \cos 25° = 2 \times 2.1 \times t_2 \cos 13°$$

or $$\frac{t_1}{t_2} = \frac{\cos 13°}{\cos 25°} = \frac{.975}{.906} = 1.076$$

In other words, the thickness of the evaporated films at point "P" of Figure 1 would have to be 1.076 times as great as the thickness of the films at point "O" in order to make the color appear the same at both points. This determines the required degree of taper, but it is still necessary to determine the angle $\theta$ in Figure 6 which will give this degree of taper. If "R" is large as compared to $$\frac{W}{2} \sin \theta$$

then may be written the following equation:

$$\frac{\left(R + \frac{W}{2} \sin \theta\right)^2}{\left(R - \frac{W}{2} \sin \theta\right)^2} = 1.076$$

This merely states that the ratio of film thickness at points "P" and "O" is inversely proportional to the square of the distance from the points to the evaporator. In the particular case at hand, $R = 10''$ and $W = 1.375''$.

$$\left(\frac{10 + .6875 \sin \theta}{10 - .6875 \sin \theta}\right)^2 = 1.076$$

or $$1.4005 \sin \theta = .37$$

or $$\theta = 15° 20'$$

Turning now to Figure 7, there is shown a cross section of a dichroic coating applied in accordance with the practice of this invention. It will be seen that each of the coatings is tapered in such a magnitude that light rays intercepting them at angles and positions as indicated in Figure 6 will actually traverse each coating an amount which is optically the same regardless of the angle of incidence.

It follows, therefore, that coatings applied in a taper, as illustrated in Figure 7, will improve the efficiency of the system.

Although certain examples were given and certain methods of producing tapered coatings were suggested, it is not intended that the practice of this invention should be limited thereto.

It will be seen that improved results will be obtained by the practice of this invention, not only with crossed dichroic reflectors but with any form of dichroic reflectors.

Having thus described the invention, what is claimed is:

1. In a color selective optical system wherein light rays through said system follow divergent paths, a planar transparent support positioned obliquely in said light paths whereby the light rays strike said support at different angles of incidence and a dichroic layer supported by said transparent support, said layer being capable of reflecting a selected color band, due to interference effects, and transmitting the remaining colors of the visible spectrum, said dichroic layer having a tapered thickness varying substantially inversely with the cosine of the angle of incident light to present a uniform effective optical thickness to rays passing therethrough for substantially all the ray positions of said light path whereby the color reflective property is substantially uniform across the entire layer.

2. In a color selective optical system wherein light rays through said system follow divergent paths from a source of light comprising a planar transparent support member positioned at an oblique angle to said source of light whereby the light rays strike said member at different angles of incidence and a dichroic layer on a surface of said support member, said dichroic layer having an effective optical thickness uniformly tapered across one of its dimensions substantially inversely with the cosine of the angle of incident light, said layer being capable of reflecting a selected color band, due to interference effects, and transmitting the remaining colors of the visible spectrum, and wherein said dichroic layer is thickest at the edge of said support member nearest said source of light, whereby the color reflective property is substantially uniform throughout the entire area of said layer.

3. A color selector wherein light rays approaching said selector follow divergent paths from a source of light comprising a transparent support member positioned obliquely in said light paths whereby the light rays strike said member at different angles of incidence and a coating on a surface of said support, said coating being capable of reflecting a selected color band, due to interference effects, and transmitting the remaining colors of the visible spectrum, said coating having an effective optical thickness uniformly graduated across its width substantially inversely with the cosine of the angle of incident light and wherein the maximum thickness of said coating is nearest to the source of light and wherein the maximum thickness of said coating is a fraction of the wave length of the color of the light to be transmitted therethrough, whereby the reflective property is substantially uniform throughout the entire layer.

4. A color selective reflector wherein the light rays striking said reflector follow divergent paths, comprising a transparent support having a plurality of coatings positioned obliquely in said light path, whereby the light rays strike said coatings at different angles of incidence, said coatings being capable of reflecting a selected color band, due to interference effects, and transmitting the remaining colors of the visible spectrum, at least one of said coatings having a thickness gradually varying across one of its surface dimensions so that the product of the thickness of the coating and the cosine of the angle of the refracted light in said coating at any particular point is substantially constant, the variation in thickness being selected in order that said coatings present a uniform effective thickness to substantially all the rays of light in said light path and wherein the maximum thickness of each of said coatings is a fraction of a wave length of the color of the light to be transmitted therethrough, whereby the color reflective property is substantially uniform throughout the entire surface of said coatings.

5. A color selective reflector wherein light rays approaching said reflector follow divergent paths from a source of light, comprising a transparent support member positioned obliquely to said source of light whereby the light rays strike said member at different angles of incidence and a plurality of dichroic coatings on said member, said coatings being capable of reflecting a selected color band, due to interference effects, and transmitting the remaining colors of the visible spectrum, a number of said dichroic coatings having a thickness uniformly varying across one of its surface dimensions substantially inversely with the cosine of the angle of incident light and wherein the thickest portion is nearest to said source of light, whereby the color reflective property is substantially uniform throughout the entire surface of said coatings.

6. In a color selective optical system wherein light rays through said system follow divergent paths, a plurality of different color selective reflectors, each color selective reflector comprising in combination a planar transparent support member and a layer supported by said transparent support, said layer being capable of reflecting a selected color band, due to interference effects, and transmitting the remaining colors of the visible spectrum, said support member positioned obliquely in said light path whereby the light rays strike said member at different angles of incidence, said layer having a uniformly tapered thickness across its entire surface which varies substantially inversely with the cosine of the angle of incident light, whereby the color reflective property is substantially uniform throughout the entire surface of said layer.

7. In a color selective optical system wherein light rays through said system follow divergent paths from a light image source, a plurality of different color selective reflectors, each positioned adjacent said image source whereby said light rays strike each of said reflectors at different angles of incidence, and each of said reflectors positioned to extend on both sides of the other reflectors, each of said color selective reflectors comprising in combination a planar and transparent support member and a tapered layer supported by said member, said layer being capable of reflecting a selected color band, due to interference effects, and transmitting the remaining colors of the visible spectrum, said layer having a thickness which varies substantially directly as a function of the angle of incidence of the light from said image source and wherein the maximum thickness of said layer is less than a wave length of the color of the light to be transmitted therethrough whereby the color reflective property is substantially uniform throughout the entire reflecting area.

8. A crossed dichroic reflector arranged for close association with a light image wherein light rays striking said reflector follow divergent paths, comprising in combination a plurality of transparent planar support members, each of said support members having a dichroic coating on a surface of each support member, said coating being capable of reflecting a selected color band, due to interference effects, and transmitting the remaining colors of the visible spectrum, said dichroic coating comprising layers of material having different indices of refraction and different thicknesses and wherein the overall thickness of said layers of material varies in magnitude in one direction from one edge of said layers of material to the other edge of said layers of material and wherein the variation and thickness is adjusted so that the coating presents a uniform effective optical thickness to substantially all the rays of light passing therethrough from said image whereby the color reflective property is substantially uniform throughout the entire cross section of the transparent dichroic coating and is substantially independent of the divergence of said rays.

9. A color selective reflector wherein light rays striking said reflectors follow divergent paths, comprising in combination a transparent planar support member positioned so that said light rays strike said member at different angles of incidence, said support member having alternate layers of material having different indices of refraction and different thicknesses wherein the overall thickness of said layers of material varies from one edge of said layers of material to the other edge of said layers of material substantially inversely with the cosine of the angle of incident light, said layers being capable of reflecting a selected color band, due to interference effects, and transmitting the remaining colors of the visible spectrum, and wherein the greater total thickness of said layers is located at the position of largest angle of incident light, whereby the color reflective property is substantially uniform throughout the entire surface of said layers.

10. A color selective reflector wherein light rays striking said reflector follow divergent paths, comprising in combination a planar transparent support member positioned so that said light rays strike said member at different angles of incidence, said support member having alternate layers of dichroic material having different indices of refraction and different thicknesses, said layers being capable of reflecting a selected color band, due to interference effects, and transmitting the remaining colors of the visible spectrum, and wherein the overall thickness of said layers of dichroic material varies in magnitude from one edge of said layers of dichroic material to the other edge of said layers of dichroic material substantially inversely with the cosine of the angle of incident light whereby the color reflective property is substantially uniform throughout the entire area of said layers.

GLENN L. DIMMICK.
MARY E. WIDDOP.

REFERENCES CITED

The following references are of record in the file of this patent:

UNITED STATES PATENTS

| Number | Name | Date |
|---|---|---|
| 1,319,292 | Kunz | Oct. 21, 1919 |
| 1,857,578 | Wright | May 10, 1932 |
| 2,027,369 | Bourges | Jan. 14, 1936 |
| 2,259,395 | Sachtleben | Oct. 14, 1941 |
| 2,341,827 | Sukumlyn | Feb. 15, 1944 |
| 2,351,536 | Osterberg et al. | June 13, 1944 |
| 2,352,777 | Douden | July 4, 1944 |
| 2,374,475 | Eagle et al. | Apr. 24, 1945 |
| 2,393,782 | Kingslake et al. | Jan. 29, 1946 |
| 2,397,929 | Dimmick | Apr. 9, 1946 |
| 2,412,496 | Dimmick | Dec. 10, 1946 |
| 2,420,168 | Dimmick | May 6, 1947 |
| 2,472,991 | Sukumlyn | June 14, 1949 |